United States Patent

[11] 3,615,384

| [72] | Inventors | Edward Gipstein;<br>William A. Hewett, both of Saratoga, Calif. |
|---|---|---|
| [21] | Appl. No. | 50,970 |
| [22] | Filed | June 29, 1970 |
| [45] | Patented | Oct. 26, 1971 |
| [73] | Assignee | International Business Machines Corporation<br>Armonk, N.Y. |

[54] ELECTROPHOTOGRAPHIC PROCESS EMPLOYING VINYL BITHIOPHENE POLYMERIC PHOTOCONDUCTORS
4 Claims, No Drawings

[52] U.S. Cl. .................................................. 96/1 R, 96/1.5, 252/501, 260/79.7
[51] Int. Cl. .................................................. G03g 5/00, H01l 13/00, C08f 15/00

[50] Field of Search .................................................. 96/1, 1.5; 252/501; 260/79.7

[56] References Cited
UNITED STATES PATENTS

| 3,234,231 | 2/1966 | Siegrist et al. | 260/307 |
|---|---|---|---|
| 3,242,188 | 3/1966 | Siegrist et al. | 260/307 |
| 3,512,966 | 5/1970 | Shattuck et al. | 96/1 |
| 3,545,969 | 12/1970 | Herrick, Jr. et al. | 96/1 |

*Primary Examiner*—George F. Lesmes
*Assistant Examiner*—M. B. Wittenberg
*Attorneys*—Hanifin and Jancin and Joseph G. Walsh ABSTRACT: Photoconductors comprising vinyl bithiophene polymers and their use in electrophotographic processes.

ELECTROPHOTOGRAPHIC PROCESS EMPLOYING VINYL BITHIOPHENE POLYMERIC PHOTOCONDUCTORS

FIELD OF THE INVENTION

This application is concerned with vinyl bithiophene compounds with polymers thereof, and with the use of the polymers as photoconductors in electrophotographic processes.

Prior Art

Other photoconductive polymers have in the past been used in electrophotographic processes, but they have all been different in chemical structure from the vinyl bithiophene polymers of the present invention.

The preparations of starting materials for the synthesis of the present invention are described in Tetrahedron 23,4419 (1967) and J. Chem. Soc. 3234 (1959).

SUMMARY OF THE INVENTION

It has now been discovered that vinyl bithiophene polymers are useful as photoconductors in electrophotographic processes. The term vinyl bithiophene polymer is intended to include all polymers of the substituted and unsubstituted vinyl bithiophene monomers and also copolymers thereof with other vinyl monomers. Vinyl bithiophene monomers useful in the present invention include, for example, 5-vinyl-2,2'-bithiophene, 5,5'-divinyl-2,2'-bithiophene, and similarly substituted 2,3' and 3,3' bithiophenes. Other substituents may also be present, for example, lower alkyl, phenyl, acyl, acyloxy, cyano, nitro, halogen and formyl groups, for example at the 5' position. All have in common a vinyl group as a substituent on two joined thiophene rings, and therefore, all are capable of forming vinyl bithiophene polymers.

These vinyl bithiophene compounds can readily be homopolymerized or copolymerized with other vinyl containing monomers such as styrene, vinyl acetate, methyl methacrylate, vinyl indole, vinyl carbazole, vinyl anthracene, vinyl phenothiazine, vinyl dibenzofuran and other reactive vinyl monomers. Polymerization can be carried out with or without solvent at temperatures from $-80°$ to $150°$ C. by means of heat, light or with catalysts such as benzoyl peroxide, $\alpha,\alpha'$-azobisisobutyronitrile, diethylaluminum chloride, n-butyllithium, Ziegler-Natta catalysts, etc.

There are several well-known electrophotographic reproduction processes in current use. They differ in the particular way in which they are carried out, particularly the sequence in which electric charging (usually with a corona) and illumination are carried out. All electrophotographic reproduction processes, however, involve the process step of selectively rendering portions of a photoconductor electrically conductive by selective exposure to light. The polymers of the present invention are useful in such processes.

In a preferred variation of the present invention, the vinyl bithiophene polymers are increased in sensitivity by the addition of one or more sensitizers. Such sensitizers, which are well-known in the art for use with other polymers, are electron accepting compounds, sometimes called Lewis acids. The compound 2,4,7-trinitrofluorenone is particularly preferred. It is believed that the sensitizing compounds form complexes with the vinyl bithiophene polymer.

The following examples are given solely for purposes of illustration, and are not to be construed as limitations of the invention, many variations of which will occur to those skilled in the art, without departing from the spirit or scope thereof. It is apparent that synthetic procedures analogous to those given below may be used to prepare related compounds.

EXAMPLE I

Synthesis of 5-Vinyl-2,2'-bithiophene Monomer 1. 5-Formyl-2,2'-bithiophene: $POCl_3$, 113.5 g. (0.74 mole) was added in small portions to 2,2'-bithienyl, 80 g. (0.48 mole) and 64 g. (0.87 mole) dimethylformamide in 650 ml. toluene. After the exothermic reaction had subsided, the mixture was heated on a steam bath for 2.5 hr., cooled and a warm-saturated aqueous solution of 600 ml. sodium acetate was added. The organic layer was separated and then evaporated to give a yellow residue which was recrystallized from benzene/pet ether (30–60) in a 1:10 ratio to give 39 g. (0.21 mole) (42 percent) pure product, m.p. 58–9°. Calcd. for $C_9H_6OS$: C, 55.67; H, 3.09; S, 32.99. Found: C, 55.48; H, 3.09; S, 32.99.

2. 5-Vinyl-2,2'-bithiophene: 5-Formyl-2,2'-bithiophene, 19.4 g. (0.1 mole) was added to a small molar excess of triphenylphosphine methylene (Wittig Reagent) prepared from triphenylmethylphosphonium bromide and n-butyllithium in 300 ml. anhydrous ether solvent in a dry-nitrogen atmosphere. The mixture was stirred 3 hr. at 25 and then refluxed 21 hr. under a nitrogen atmosphere. The mixture was cooled and then passed through a chromatographic column over $Al_2O_3$ to separate the products. The crude vinyl compound which was eluted first, was passed through a second column to remove trace impurities using benzene as the eluent. After evaporation of the eluent, 17 g. (88 percent) of an orange oil was obtained. The oil was purified further by distillation at 82°–84° and at 0.02 mm. to give 6.2 g. of a light yellow oil and 10.8 g. of a solid polymer. The novel vinyl monomer was identified and characterized by infrared, NMR and U.V. spectroscopy. The IR spectrum showed typical vinyl absorption bands at 985, 905, 1410, and 1430 cm.$^{11}$. The NMR spectrum showed a typical pattern for vinyl protons at 5.12, 5.50 and 6.74$\delta$. The UV absorption spectrum in EtOH showed three major bands at 340 $\mu$ ($\Sigma_{max}$ 158,240), 242 $\mu$ ($\Sigma_{max}$ 8160) and 198 $\mu$ ($\Sigma_{max}$ 15,456). The elemental analysis was in agreement with the theory. Calcd. for $C_{10}H_8S_2$: C, 62.50; H, 4.17; S, 33.33. Found: C, 62.42; H, 4.24; S, 33.12.

EXAMPLE II

Bulk Polymerization of 5-Vinyl-2,2'-bithiophene

A 50 ml. single-necked flask was filled with 8.8 g. (0.045 mole) 5-vinyl-2,2'-bithiophene monomer and the flask connected to a high-vacuum manifold. The monomer was degassed and then slowly heated to 130°–140° for 16 hr. in an oil bath. The flask was cooled to 25° and the orange solid obtained was dissolved in hot benzene, filtered and precipitated as a light yellow powder from a large excess of methyl alcohol. Repeated purification followed by vacuum drying at 50° for 48 hr. gave 5.2 g. (59 percent) polymer, m.p. range 99°–111°. Gel permeation chromatographic analysis indicated a number average molecular weight ($\overline{M}_n$) of 4,300 and a weight average molecular weight ($\overline{M}_w$) of 39,000. Analysis: Calcd. for $(C_{10}H_8S)_x$: C, 62.50; H, 4.17; S, 33.33. Found: C, 62.45; H, 4.06; S, 33.09.

EXAMPLE III

A photoconductive element was prepared from the polymer of Example II by forming a solution of 2,4,7-trinitrofluorenone and the polymer (repeat unit) in a 1/1 molar ratio. The tetrahydrofuran (THF) solution was coated on an aluminum substrate with a doctor blade set on a 5 mil. wet gap. The element was tested for photoconductive and electrophotographic properties on an electrometer. The results obtained were as follows:

| Charge Acceptance, volts | | T ½, seconds | |
| --- | --- | --- | --- |
| + | − | + | − |
| not measurable | 350 | not measurable | 12 |

EXAMPLE IV

Polymerization of 5-Vinyl-2,2'-bithiophene with azobisisobutyronitrile (AIBN) Catalyst The polymerization of 1.9 g. (0.01 mole) of 5-vinyl-2,2'-bithiophene was carried out in 25 ml. benzene solvent under argon in a 200 ml. 3-necked flask equipped with stirrer, thermometer, gas-inlet tube and water condenser. The mixture was heated to reflux (80°) and 8.2 mg. (5 10$^{15}$ mole) AIBN catalyst was added. After 24 hrs. the polymerization was terminated by pouring the reaction mixture into 500 ml. of methyl alcohol to give a yellow solid. Repeated precipitation from benzene/methanol gave 0.3 g. (15.7 percent) of a light yellow polymer after vacuum drying at 40° for 24 hrs., m.p. range 112–122°. Gel permeation chromatographic analysis indicated a $\overline{M}_n$ of 9,570 and a $\overline{M}_w$ of 45,077. The elemental analysis was C, 61.97; H, 4.29; S, 32.98.

EXAMPLE V

Polymerization of 5-Vinyl-2,2'-bithiophene with Boron Trifluoride/Etherate Catalyst The polymerization of 1.9 g. (0.01 mole) of 5-vinyl-2,2'-bithiophene was carried out at -78° in 25 ml. dichloromethane in an apparatus similar to that of Example IV. Polymerization was initiated by the addition of 13.5 mg. BF$_3$. (C$_2$H$_5$)$_2$O catalyst. The mixture after 4.5 hrs. was poured into 500 ml. methanol precipitating a solid. Workup from THF/MeOH gave a soluble fraction of 1.0 g. m.p. 128°–140° and 0.3 g. of insoluble polymer, m.p. 235°–250°. The overall yield was 68 percent. Gel permeation chromatographic analysis indicated an $\overline{M}_n$ of 9014 and an $\overline{M}_w$ of 48,000. The polymer had the following elemental analysis: C, 62.51; H, 4.34; S, 33.22.

EXAMPLE VI

Polymerization of 5-Vinyl-2,2'-bithiophene with Ziegler-Natta Catalyst

The polymerization was carried out in 35 ml. benzene at 55° under argon in an apparatus similar to that of Examples IV and V with the following reactants:

| | |
|---|---|
| Monomer | 5.0 g. (0.026 mole) |
| Solvent | 35 ml. Benzene |
| Catalysts | |
| Et$_2$AlCl | 0.784 g. (6.5×10$^{13}$ mole) |
| α-TiCl$_3$ | 0.401 g. (2.6×10$^{13}$ mole) |
| Monomer/Ti | 10/1 |
| Al/Ti | 2.5/1 |

The polymerization was terminated after 24 hrs. by pouring the mixture into 650 ml. methanol. The tan-colored solid obtained was washed with conc. HCl and water and then extracted with THF. A soluble fraction of 2.5 g., m.p. 177°–**° and an insoluble fraction of 1.3 g., 9., m.p. 263°–275° was obtained after vacuum drying for 48 hrs. The overall yield was 76 percent. Gel permeation chromotographic analysis of the soluble fraction indicated an $\overline{M}_n$ of 16,293 and an $\overline{M}_w$ of 88,000. The elemental analysis was as follows: C, 62.16; H, 4.28; S, 33.39.

EXAMPLE VII

Polymerization of 5-Vinyl-2,2'-bithiophene with n-Butyllithium Catalyst

Anionic polymerization was carried out in 60 ml. absolute THF at -70° under argon in an apparatus similar to that of the previous example. The reactants used were as follows:

| | |
|---|---|
| Monomer | 5.0 g. (0.026 mole) |
| Catalyst | 214 mg. (3.3×10$^{13}$ mole) |
| Monomer/Catalyst | 8/1 |

After 24 hrs. the polymerization mixture was poured into 500 ml. methanol to give a yellow solid. Repeated precipitations from THF/MeOH gave after 48 hrs. of vacuum drying, 2.6 g. (52 percent) of a light tan-colored polymer, m.p. range 158–170°. Gel permeation chromatographic analysis indicated an $\overline{M}_N$ of 40,125 and an $\overline{M}_W$ of 74,365. The polymer had the following elemental analysis: C, 61.98; H, 4.18; S, 32.84.

EXAMPLE VIII

A photoconductive element prepared from the polymer of Example VII with 2,4,7-trinitrofluorenone in a 1/1 molar ratio (relative to the monomer) showed the following electrophotographic and photoconductive properties.

| Charge Acceptance, volts | | T ½, seconds | |
|---|---|---|---|
| + | − | + | − |
| 320 | 650 | 61 | 13.6 |

EXAMPLES IX—XVII

Solutions of the polymer from Example VII were prepared with eight different sensitizers in THF at concentrations varying from 1 to 50 weight percent. These solutions were coated on an aluminum substrate, i.e., aluminized Mylar (O.D.=1) with a doctor blade set on a 5–7 mil wet gap. (Mylar is polyethylene terephthalate from DuPont.) These elements showed the following dark-charge voltages when exposed to full tungsten light as measured on an electrometer:

| | Conc. Wt.% | Charge Acceptance, volts | |
|---|---|---|---|
| | | + | − |
| Tetrabromophthalic anhydride | 5 | 700 | 700 |
| 2,4-Dinitrophenol | 5 | 580 | 580 |
| 2,2',4,4',6,6'-Hexanitrodiephenylamine | 5 | 370 | 360 |
| Trinitrophenanthroquinone | 25 | 640 | 580 |
| 2,7-Dinitrophenanthroquinone | 50 | 190 | 165 |
| (Chloranil (tetrachlorol,4- benzoquinone) | 10 | 680 | 700 |
| 2,4-Dinitrobenzaldehyde | 1 | 380 | 500 |
| 2,2',4,4',6,6'-Hexanitrodiphenyl amine + crystal violet | 1.6 | 350 | 370 |
| 5-vinyl-2,2'-bithiophene polymer (unsensitized standard) | — | 590 | 640 |

Reproductions were made using a General Electric Photo BEP 115 volt lamp rated 11,000 Candle Power, 34,000°K color temperature and 300 watts. The distance from the lamp to the photoconductive element was 25 centimeters. The elements were charged with a negative (−) corona and exposed from 0.1 to 0.5 seconds through a positive transparent mask. All films were 5–10 mils thick. The control was poly-5-vinyl-2,2'-bithiophene without an activator. In all cases, the reproductions were readily legible and of good quality.

EXAMPLE XVIII

Copolymerization of 5-Vinyl-2,2'-bithiophene with 4-Vinyldibenzofuran

Five grams (0.026 mole) of 5-vinyl-2,2'-bithiophene, 5.1 g. (0.026 mole) of 4-vinyl-dibenzofuran and 0.051 g. (2.1×10$^{14}$ mole) benzoylperoxide catalyst were weighed into a heavy-walled Pyrex Schlenk tube. The mixture was degassed 16 hrs. under vacuum and was then sealed at 10$^{16}$ mm. Hg. The tube and its contents was heated 48 hrs. in an oil bath at 150°. The yellow viscous product obtained was dissolved in THF and precipitated in 600 ml. methanol. Several precipitations from THF/MeOH gave after vacuum drying 24 hrs. at 50°, 5.8 g. (57.7 percent) of a white powder, m.p. range 158°–162°. The GPC analysis indicated an $\overline{M}_n$ of 8,600 and $\overline{M}_w$ of 13,000. The elemental analysis indicated a 1/1 copolymer of the following composition: Calcd. for (C$_{24}$H$_{18}$OS$_2$)$_x$: C, 74.54; H, 4.68; S, 16.69. Found: C, 73.95; H, 4.74; S, 16.01.

EXAMPLE XIX

A photoconductive element was prepared from the copolymer of Example XVIII by forming a solution of 2,4,7-trinitrofluorenone and the copolymer in a 1/1 molar ratio, based on average repeat unit. The THF solution was coated on an aluminum substrate with a doctor blade set on a 5 mil. wet gap. The element was tested on an electrometer and the following photoconductive and electrophotographic properties were obtained:

| Charge Acceptance, volts | | ½, seconds | |
|---|---|---|---|
| + | − | + | − |
| 250 | 600 | 54 | 12 |

EXAMPLE XX
Copolymerization of 5-Vinyl-2,2'-bithiophene with n-Vinylindole

Five grams (0.026 mole) of 5-vinyl-2,2'-bithiophene, 3.7 g. (0.026 mole) n-vinylindole and 0.051 g. (2.1×10$^{14}$ mole) benzoylperoxide catalyst were weighed into a heavy-walled Pyrex Schlenk tube. The mixture was degassed 18 hrs. under vacuum after which the tube was sealed at 10$^{16}$mm. Hg. The mixture was heated at 150° for 48 hrs. in an oil bath to give a brown solid. Repeated precipitation from THF/MeOH gave after vacuum drying at 50° for 48 hrs., 2.6 g. (30percent) of a light tan powder, m.p. range 135°–143°. GPC analysis indicated an $\overline{M}_n$ of 3,729 and an $\overline{M}_w$ of 6737. Elemental analysis indicated an 80/20 copolymer of the following composition: Calcd. for $(C_{50}H_{41}NS_3)_x$: C, 66.78; H, 4.70; N, 1.96; S, 26.66. Found: C, 66.52; H, 4.53; N, 2.24; S, 26.27.

EXAMPLE XXI

A photoconductive element was prepared form the copolymer of Example XX by forming a solution of 2,4,7-trinitrofluorenone and the copolymer in a 1/1 molar ratio, based on the average repeat unit. The THF solution was coated on an aluminum substrate with a doctor blade set on a 5 mil. wet gap. The element was tested on an electrometer and the following photoconductive and electrophotographic properties were obtained:

| Charge Acceptance, volts | | T ½, seconds | |
|---|---|---|---|
| + | − | + | − |
| 70 | 160 | 43 | 18 |

What is claimed is:
1. In an electrophotographic reproduction process which comprises selectively rendering portions of a photoconductor electrically conductive by selective exposure to light, the improvement according to which the photoconductor comprises a vinyl bithiophene polymer.
2. A process as claimed in claim 1 wherein the photoconductor comprises a vinyl bithiophene polymer complexed with an electron accepting compound.
3. A process as claimed in claim 2 wherein the electron accepting compound is 2,4,7-trinitrofluorenone.
4. A process as claimed in claim 3 wherein the electron accepting compound is tetrabromophthalic anhydride.